(12) United States Patent
Tschol et al.

(10) Patent No.: US 11,051,605 B2
(45) Date of Patent: Jul. 6, 2021

(54) ORAL CARE IMPLEMENT AND METHOD FOR MANAFACTURING SUCH ORAL CARE IMPLEMENT

(71) Applicant: The Gillette Company LLC, Boston, MA (US)

(72) Inventors: Armin Tschol, Frankfurt am Main (DE); Benedikt Heil, Eschborn (DE); Aycan Sentürk Andersson, Frankfurt (DE); Stephanie Venzke, Wiesbaden (DE); Marlis Hübner, Mason, OH (US)

(73) Assignee: The Gillette Company LLC, Boston, MA (US)

(*) Notice: Subject to any disclaimer, the term of this patent is extended or adjusted under 35 U.S.C. 154(b) by 196 days.

(21) Appl. No.: 15/949,865

(22) Filed: Apr. 10, 2018

(65) Prior Publication Data
US 2018/0289141 A1    Oct. 11, 2018

(30) Foreign Application Priority Data

Apr. 10, 2017 (EP) .................. 17165719

(51) Int. Cl.
*A46B 5/02* (2006.01)
*B29C 45/16* (2006.01)
*B29C 45/00* (2006.01)
*B25G 1/10* (2006.01)
*B29K 21/00* (2006.01)
(Continued)

(52) U.S. Cl.
CPC .............. *A46B 5/026* (2013.01); *A46B 5/02* (2013.01); *A46B 5/021* (2013.01); *B25G 1/102* (2013.01);
(Continued)

(58) Field of Classification Search
CPC .. A46B 5/00; A46B 5/02; A46B 5/021; A46B 5/023; A46B 5/025; A46B 5/026;
(Continued)

(56) References Cited

U.S. PATENT DOCUMENTS 2,267,670 A * 12/1941 Rosenwasser ........... A46B 5/02
                                              15/143.1
6,308,367 B1 * 10/2001 Beals .................. A46B 9/025
                                              15/167.1
(Continued)

FOREIGN PATENT DOCUMENTS

CA    2238099    *  4/1999
EP     580406    *  1/1994
(Continued)

OTHER PUBLICATIONS

International Search Report with Written opinion, dated Jun. 4, 2018, 5 pages.
(Continued)

*Primary Examiner* — Mark Spisich
(74) *Attorney, Agent, or Firm* — Vladimir Vitenberg; Jason Jeffrey Camp; James Ernest Oehlenschlager

(57) ABSTRACT

An oral care implement comprises a head and a handle made of a first material. The handle has a distal end and a proximal end closest to the head. The handle comprises a thumb rest made of a second material, the second material being different from the first material. The thumb rest comprises an area from about 202 mm² to about 360 mm² and has a concave shape. The thumb rest comprises a portion being inclined with respect to a remaining portion of the thumb rest by an angle α of about 20° to about 25°, the angle α being defined by a first line and a second line. The first line extends between a most elevated point and a lowest point of the thumb rest, and the second line extends between the lowest point and an end point of the thumb rest, the end point of the thumb rest being closest to the distal end of the handle.

13 Claims, 3 Drawing Sheets

(51) Int. Cl.
*B29K 23/00* (2006.01)
*B29L 31/42* (2006.01)
*A61C 17/22* (2006.01)

(52) U.S. Cl.
CPC .......... *B29C 45/0001* (2013.01); *B29C 45/16* (2013.01); *A46B 2200/1066* (2013.01); *A61C 17/225* (2013.01); *B29K 2021/003* (2013.01); *B29K 2023/12* (2013.01); *B29L 2031/425* (2013.01); *Y10T 16/476* (2015.01)

(58) Field of Classification Search
CPC .. B25G 1/00; B25G 1/10; B25G 1/102; Y10T 16/476; A61C 17/225
See application file for complete search history.

(56) References Cited

U.S. PATENT DOCUMENTS

| | | | |
|---|---|---|---|
| 6,397,425 | B1 | 6/2002 | Szczech |
| 8,763,196 | B2 | 7/2014 | Kraemer |
| 2012/0227200 | A1 | 9/2012 | Kraemer |
| 2013/0340189 | A1 | 12/2013 | Kraemer |
| 2018/0325639 | A1 | 11/2018 | Tschol et al. |

FOREIGN PATENT DOCUMENTS

| | | | |
|---|---|---|---|
| EP | 1074200 | | 2/2001 |
| EP | 1621106 | | 2/2006 |
| JP | 7-327737 | * | 11/1995 |
| JP | 2002-28028 | * | 1/2002 |
| JP | 2005-185649 | * | 7/2005 |
| WO | 96/08182 | * | 3/1996 |
| WO | WO9837789 | | 9/1998 |
| WO | WO9923910 | | 5/1999 |
| WO | WO2013031685 | | 3/2013 |
| WO | WO2013085006 | | 6/2013 |

OTHER PUBLICATIONS

Extended European Search Report and Search Opinion; Application No. 17165719.0; dated Oct. 12, 2017; 9 pages.

* cited by examiner

ORAL CARE IMPLEMENT AND METHOD FOR MANAFACTURING SUCH ORAL CARE IMPLEMENT

FIELD OF THE INVENTION

The present disclosure is concerned with an oral care implement comprising a head and a handle made of a first material. The handle comprises a thumb rest made of a second material, the second material being different from the first material.

BACKGROUND OF THE INVENTION

Heads and handles for oral care implements, like manual and powered toothbrushes, are well known in the art. Generally, tufts of bristles for cleaning teeth are attached to a bristle carrier or mounting surface of a brush head intended for insertion into a user's oral cavity. A handle is usually attached to the head, which handle is held by the user during brushing. The head is either permanently connected or repeatedly attachable to and detachable from the handle.

In order to clean teeth effectively, appropriate contact pressure has to be provided between the free ends of the bristle tufts and the teeth. Generally, contact pressure depends not only on the bending stiffness and the displacement of the bristles, but also on the handle and head properties of the toothbrush, in particular on the shape, dimensions and bending stiffness of the handle and brush head. Usually handles of toothbrushes have the shape of a linear rod to be handled and manipulated by a user as needed. However, in the past it has been seen that such handles are neither comfortable to handle nor easy to maneuver in the oral care cavity of the user.

Usually, handles with greater length show lower bending stiffness as compared to shorter handles having a similar cross-sectional area. However, relatively long handles with relatively low thickness tend to flex away easily and the relatively low bending stiffness results in reduced plaque removal efficiency on teeth surfaces. Further, such handles provide poor maneuverability in the mouth during brushing. In order to compensate said low bending stiffness of longer handles, the size of the cross sectional area of the handle could be increased. However, relatively thick handles may also reduce ease of rotating the brush in the hand, thus, impeding the user reaching all areas in the oral cavity. Consequently, maneuverability of the overall brush is not sufficient.

In order to achieve and preserve good oral health, and to prevent gingivitis, it is important to clean teeth and gums thoroughly, in particular in hard to reach areas, e.g. in the region of the back molars. Further, gaps between teeth and periodontium, the so called gingival groove has to be thoroughly cleaned which requires a good and well-coordinated brushing technique. It is known that a lack of good removal of plaque in the gingival groove can cause gingivitis, i.e. inflammation of the gum tissue. Further, it is known that users/consumers use different brushing techniques, and, therefore, it is critical to identify optimal ergonomics of a toothbrush in order to provide good sensory feeling during brushing when using all types of brushing techniques.

It is an object of the present disclosure to provide an oral care implement which overcomes at least one of the above-mentioned drawbacks, in particular which provides more comfort and improved maneuverability of the oral care implement in the oral care cavity during brushing by optimizing the overall brush ergonomics. It is also an object of the present disclosure to provide a method for manufacturing such oral care implement.

SUMMARY OF THE INVENTION

In accordance with one aspect, an oral care implement comprising a head and a handle made of a first material is provided, the handle having a distal end and a proximal end closest to the head, the handle comprising a thumb rest made of a second material, the second material being different from the first material, the thumb rest comprising an area from about 202 mm² to about 360 mm², wherein the thumb rest has a concave shape, and the thumb rest comprises a portion being inclined with respect to a remaining portion of the thumb rest by an angle α of about 20° to about 25°, the angle α being defined by a first line and a second line, the first line extending between a most elevated point and a lowest point of the thumb rest, and the second line extending between the lowest point and an end point of the thumb rest, the end point of the thumb rest being closest to the distal end of the handle.

In accordance with one aspect, a method for manufacturing such oral care implement is provided, the method comprising the following steps:
  injection molding a first component of polypropylene material forming an underlying base structure of the oral care implement,
  injection molding a second component of polypropylene material over the first component, injection molding a third component of thermoplastic elastomer material over the first component and the second component.

BRIEF DESCRIPTION OF THE DRAWINGS

The invention is described in more detail below with reference to various embodiments and figures, wherein.

DETAILED DESCRIPTION OF THE INVENTION

The oral care implement according to the present disclosure comprises a head on which at least one tooth cleaning element, e.g. a tuft of bristles and/or one or more elastomeric elements may be fixed, and a handle having a distal end and a proximal end. The proximal end of the handle is closest to the head and is opposite the distal end.

The handle of the oral care implement is made of a first material, e.g. polypropylene, and comprises a thumb rest made of a second material. The second material is different from the first material. Such thumb rest may be made from a thermoplastic elastomer, e.g. having a Shore A hardness from about 30 to about 60, or about 40. Said material may prevent the oral care implement from being too slippery when used in wet conditions. The handle may further comprise another material, e.g. polypropylene having another color as compared to the first material.

The thumb rest has an area from about 202 mm$^2$ to about 360 mm$^2$, or from about 250 mm$^2$ to about 353 mm$^2$, or from about 270 mm$^2$ to about 350 mm$^2$, or about 290 mm$^2$ or about 340 mm$^2$.

The thumb rest has a concave shape and comprises a portion which is inclined with respect to a remaining portion of the thumb rest by an angle $\alpha$ of about 20° to about 25°, or about 24°. The angle $\alpha$ is defined by two lines, i.e. a first line and a second line. The first line extends between a most elevated point of the thumb rest and a lowest point of the thumb rest (when seen in a side view, cf. FIGS. 1 and 3). The second line extends between the lowest point and an end point of the thumb rest. The end point of the thumb rest is defined as the point being closest to the distal end of the handle, i.e. furthest away from the head. Such ergonomics may allow for improved control and maneuverability of the oral care implement during brushing (cf. test results in Table 1 below).

Figure 4:
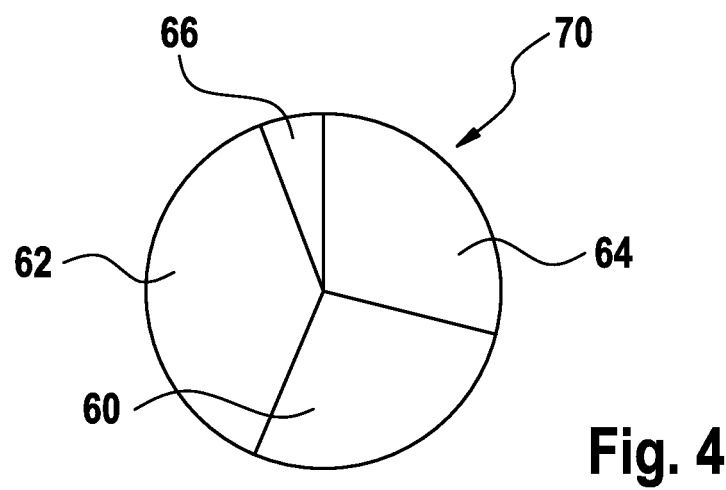
FIG. 4 shows a graphic highlighting the impact of toothbrush ergonomics on the overall consumer product experience.

Surprisingly, consumer test results revealed that specific technical parameters for manual toothbrushes in terms of ergonomics have significant impact on the overall product experience. As shown in FIG. 4, ergonomics have an impact on the overall product experience of about 27%. Cleansing/refreshing has an impact of about 38% followed by gentleness of about 29%. Visual appearance of a toothbrush has an impact on the overall product experience of about 6%, only. According to these test results, ergonomics of manual toothbrushes are a main driver for consumer/user appeal; surprisingly, its impact is similar to the impact of gentleness. In other words, in order to achieve the desired product experience of a toothbrush, the ergonomics of a brush are as important as gentleness. Without having the right ergonomics, a toothbrush cannot clean in all regions of the oral cavity with sufficient cleaning satisfaction.

Further, consumer test results revealed that the following parameters are critical drivers for ergonomics and, thus, have significant impact on the overall product experience: Overall length extension of the oral care implement, ratio of the length extension of the handle to the overall length extension of the oral care implement, size of the thumb rest area, bending direction of the thumb rest (concave/convex), and angle $\alpha$ of the thumb rest. These parameters were varied and tested to identify the ideal combination of these parameters.

In principal, there are five different grip styles or ways to hold a toothbrush during tooth brushing: "Oblique", "Distal oblique", "Power", "Precision" and "Chopstick". These grip styles can be defined by the following characteristics (cf. FIGS. 5 to 9):

"Oblique": Very often used; handle weight is loosely placed in the palm; thumb is extended relative to the forefinger; allows good grip and navigation similar to cutting with a knife. Most often used for brushing as this is a common style applied for several occasions during a day, e.g. eating, hair combing, brush sweeping. In most cases consumers using this style are applying the scrubbing technique (i.e. a forth and back movement) to clean their teeth.

"Distal oblique": Very often used; handle weight is loosely placed in the palm; thumb and ring finger oppose each other; allows good grip and navigation similar to cutting with a knife. Also often used for brushing as this is a common style applied for several occasions during a day, e.g. eating, hair combing, brush sweeping. In most cases consumers using this style are applying the scrubbing technique (i.e. a forth and back movement) to clean their teeth.

"Power": Infrequently used; fingers wrap tightly around the handle; the thumb is mostly extended or wraps tightly around the handle; used by consumers thinking "more pressure cleans better", or as one of multiple changing styles during brushing for areas where consumers need better control, e.g. at the back molars or inner tooth surfaces. Some consumers are holding the handle at the lower end in order to reduce pressure. Also used by most kids when they start brushing on their own.

"Precision": Infrequently used; weight of the handle mainly on fingertips; thumb and forefinger oppose each other; as this is a non-pressure style it is often used for hard to reach or sensitive areas, e.g. at the inner tooth surfaces. Often observed as transition grip to "Distal oblique" or "Oblique", but some consumers use it as their "only grip style".

"Chopstick": Frequently used in chopstick regions; forefinger and thumb oppose each other thereby holding the handle tightly. Based on consumer habits, i.e. "Chopstick" style is very common in Asia; very familiar as it is often used for other occasions; used similar to the "Precision" style as the gentle way to clean hard to reach or sensitive areas.

Surprisingly, consumer tests revealed that a toothbrush comprising a thumb rest having an area from about 202 mm$^2$ to about 360 mm$^2$, or from about 250 mm$^2$ to about 353 mm$^2$, or from about 270 mm$^2$ to about 350 mm$^2$, or about 290 mm$^2$, or about 340 mm$^2$, in combination with an inclined portion of the thumb rest with an angle $\alpha$ of about 20° to about 25°, or about 24° provides improved overall product experience to users/consumers. When applying any of the above described grip styles maneuverability of a toothbrush according to the present disclosure is significantly improved. The consumer tests revealed that the toothbrush of the present disclosure allows for a well-coordinated brushing technique. These consumer tests were carried out by US Americans in Germany Consumers of a test panel applied a combination of the above described grip styles and gave their assessment with respect to the ergonomics (cf. Table 1 below).

The thumb rest or gripping region may be attached onto the front surface of the handle in the region close to the proximal end, i.e. closest to the head. The thumb rest may comprise a plurality of ribs extending substantially perpendicular to the longitudinal axis of the oral care implement. Such ribs may allow users/consumers to use the oral care implement with even more control. The user/consumer can better grasp and manipulate the handle of the oral care implement during brushing. Such handle may provide improved control and greater comfort during brushing, in particular under wet conditions.

The handle and the head of the oral care implement have each a length extension extending along the longitudinal extension of the oral care implement. The length extension of the head and the length extension of the handle may together define the overall length extension of the oral care implement.

The length extension of the handle is defined as the section/portion of the oral care implement which extends from the distal end to the proximal end, i.e. to the end of the handle closest to the head. In other words, the head and handle merge at the proximal end of the handle. At the proximal end of the handle, a distance between a front surface and a back surface of the handle may have a maximum (when seen in a side view, cf. FIG. 3). In some cases, oral care implements are defined as having a head, a handle and a neck, the latter extending between the head and the handle. In the following and according to the present disclosure, a neck, usually having the smallest cross-sectional area extending substantially perpendicular to the longitudinal axis of the overall oral care implement is defined as a part of the brush head.

Surprisingly, the consumer tests also revealed that an overall length extension of the oral care implement along its longitudinal axis from about 194 mm to about 197 mm, or from about 195 mm to about 196 mm, or about 195 mm in combination with a ratio of the length extension of the handle to the overall length extension of the oral care implement from about 0.59 to about 0.65, or from about 0.60 to about 0.64, or from about 0.61 to about 0.63 or about 0.62 provides improved overall product experience to users/consumers. When applying any of the above described grip styles maneuverability and control of a toothbrush according to the present disclosure is significantly improved. The consumer tests revealed that the toothbrush of the present disclosure allows for a well-coordinated brushing technique (cf. Table 1 below).

The overall length extension of the oral care implement may be about 195 mm, the ratio of the length extension of the handle to the overall length extension of the oral care implement may be about 0.62, and the area of the thumb rest may be about 290 mm$^2$ or about 340 mm$^2$, and the angle α may be about 24°.

The handle extension may be from about 119 mm to about 123 mm, or about 121 mm. The head extension may be from about 72 mm to about 76 mm, or about 74 mm.

A method for manufacturing the oral care implement according to the present disclosure may comprise the following steps:
- injection molding a first component of polypropylene material forming an underlying base structure of the oral care implement,
- injection molding a second component of polypropylene material over the first component,
- injection molding a third component of thermoplastic elastomer material over the first component and/or the second component.

The third component of thermoplastic elastomer material may form the thumb rest on the front surface of the oral care implement and a palm grip on the back surface being opposite the front surface to be gripped by the user's/consumer's fingers and thumb. Such handle configuration may even further resist slippage during use. The thermoplastic elastomer material may extend through an aperture provided in the underlying base structure and/or second component of the handle.

The oral care implement may be a manual toothbrush or a powered driven toothbrush. The oral care implement may also be an inter-proximal pick, a plaque scraper or tissue/tongue cleanser.

The following is a non-limiting discussion of example embodiments of oral care implements and parts thereof in accordance with the present disclosure, where reference to the Figures is made.

Figure 1:
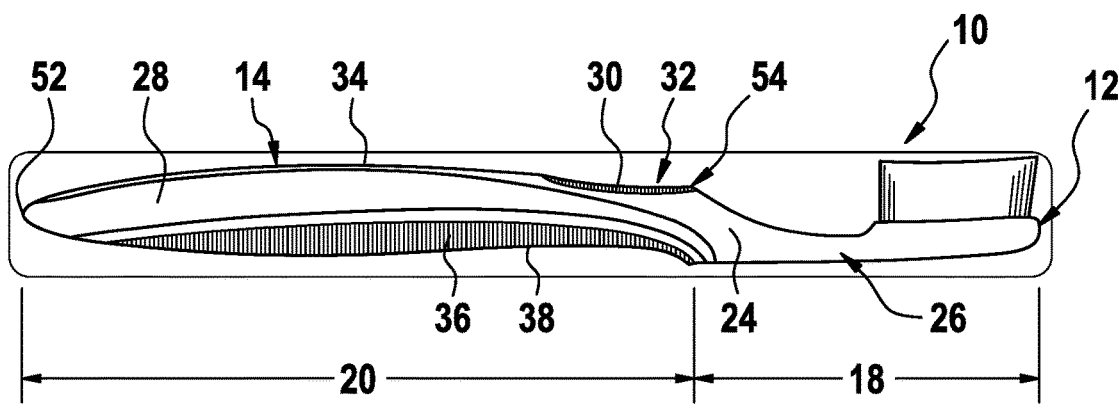
FIG. 1 shows a side view of an example embodiment of an oral care implement according to the present disclosure.
Figure 2:
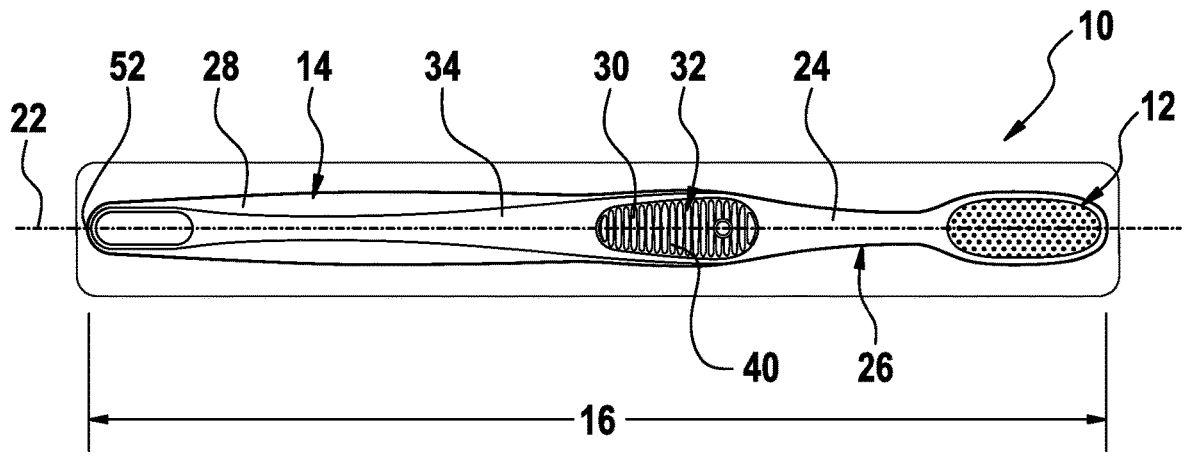
FIG. 2 shows a top-down view on the embodiment of FIG. 1.

FIGS. 1 and 2 show two projections of an oral care implement 10, i.e. a toothbrush 10 of the present disclosure. FIG. 1 shows a side view of the toothbrush 10, while FIG. 2 shows the respective top-down view.

Toothbrush 10 comprises a head 12 and a handle 14. An overall length extension 16 of the toothbrush 10 along its longitudinal axis 22 is composed of a length extension 18 of the head 12 and a length extension 20 of the handle 14. The overall length extension 16 of the toothbrush 10 is about 195 mm, while the length extension 18 of the head 12 may be about 74 mm and the length extension 20 of the handle 14 may be about 121 mm. Consequently, the ratio of the length extension 20 of the handle 14 to the overall length extension 16 of the toothbrush 10 is about 0.62. The handle has a distal end 52 furthest remote from the head 12 and a proximal end 54 closest to the head 12.

The length extension 20 of the handle 14 extends from the distal end 52 to the proximal end 54, i.e. to the end of the handle 14 closest to the head 12. The head 12 and handle 14 merge at the proximal end 54 of the handle 14. At the proximal end 54 of the handle 14, the distance 56 between a front surface 34 and a back surface 38 of the handle 14 may have a maximum (when seen in a side view, cf. FIG. 3).

Handle 14 is formed from three different materials: A first component of a polypropylene material 24 provided by an injection molding step forms an underlying base structure 26. A second component of another polypropylene material 28 is injection molded over the first component 24, and a third component of thermoplastic elastomer material 30 is injection molded over the first and the second component 24, 28. The third component of thermoplastic elastomer material 30 provides a thumb rest 32 on a front surface 34 of the handle 14 and a palm grip 36 on a back surface 38 of the handle 14, the back surface 38 being opposite the front surface 34.

The polypropylene material of the first component and the polypropylene material of the second component may only differ in terms of color. Both polypropylene materials are relatively hard as compared to the thermoplastic elastomer material of the third component. The thermoplastic elastomer material of the third component may have a Shore A hardness of about 30 to about 60, or about 40.

Figure 3:
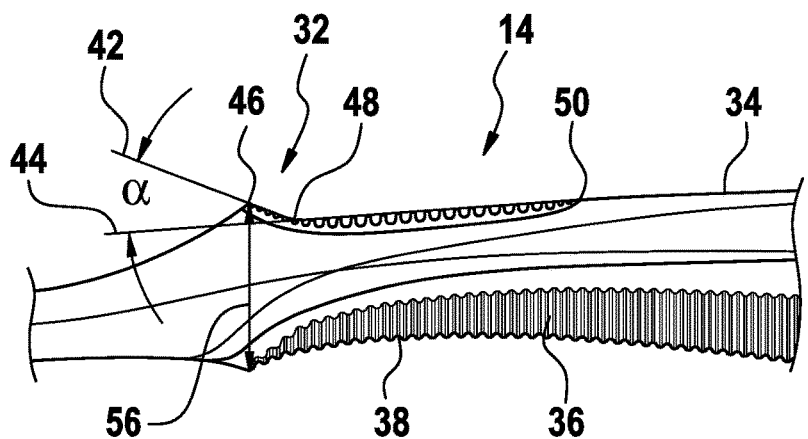
FIG. 3 shows a portion of the handle of the embodiment of FIG. 1.

The thumb rest 32 has an area 40 of about 290 mm$^2$ or about 340 mm$^2$. The shape of the thumb rest 32 is concave, i.e. the thumb rest is inwardly curved with respect to the handle. As shown in FIG. 3, a portion of the thumb rest 32 is inclined with respect to the remaining portion of the thumb rest 32 by an angle α. The angle α may be about 24°, and is defined between a first line 42 and a second line 44. The first line 42 extends between a most elevated or highest point 46 of the thumb rest 32 and a lowest point 48 of the thumb rest 32 (as shown in the side view in FIG. 3). The second line 44 extends between the lowest point 48 of the thumb rest 32 and an end point 50, i.e. the most remote point of the thumb rest 32 closest to the distal end 52 of the handle 14.

FIG. 4 shows a graphic 70 highlighting the impact of toothbrush ergonomics 60 on the overall consumer product experience. Consumer test results revealed that ergonomics 60 have an impact on the overall product experience of about 27%. Cleansing/refreshing 62 has an impact of about 38% followed by gentleness 64 of about 29%. Visual appearance 66 of a toothbrush has an impact on the overall product experience of about 6%, only.

Figure 5:
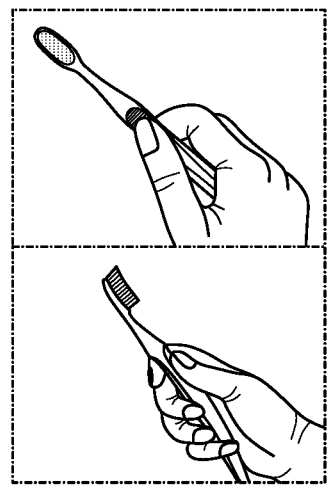
FIG. 5 shows the "Oblique" grip style.
Figure 6:
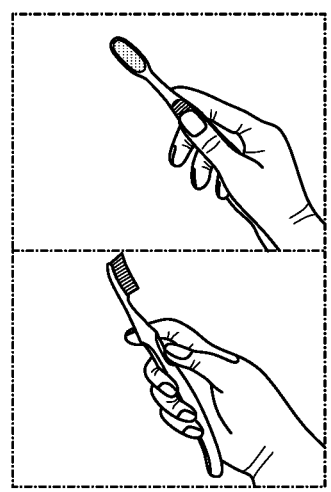
FIG. 6 shows the "Distal oblique" grip style.
Figure 7:
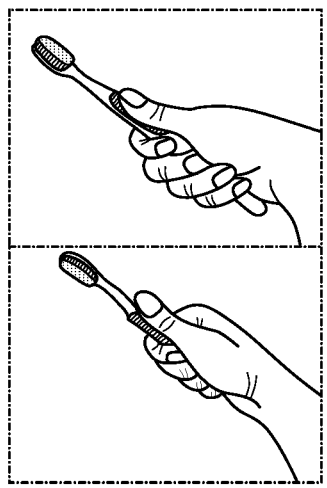
FIG. 7 shows the "Power" grip style.
Figure 8:
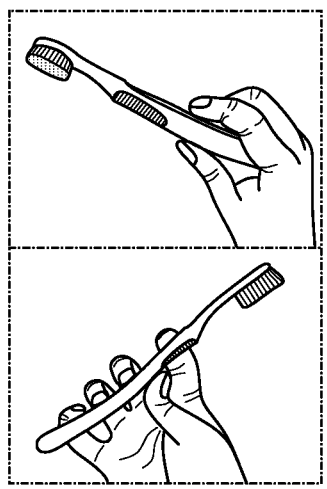
FIG. 8 shows the "Precision" grip style.
Figure 9:
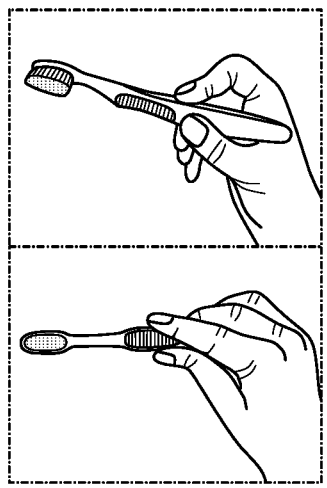
FIG. 9 shows the "Chopstick" grip style.

There exist five different grip styles or ways to hold a toothbrush during tooth brushing. FIG. 5 shows the "Oblique" grip style, FIG. 6 shows the "Distal oblique" grip style, FIG. 7 shows the "Power" grip style, FIG. 8 shows the "Precision" grip style, and FIG. 9 shows the "Chopstick" grip style. The characteristics when using the respective grip styles are described above.

Comparison Experiments

Consumer tests with 20 trained and experienced panelists were carried out. The panelists were asked to rate toothbrushes in terms of ergonomics, maneuverability and control on a scale between "0" and "10", wherein "10" represents the best rating. The panelists were brushing their teeth in front of a mirror, thereby reflecting the actual usage situation.

The following toothbrushes were tested: Example embodiment 10 according to FIGS. 1 to 3 and comparative examples 100, 200, 300 and 400 according to the toothbrush specification of Table 1.

TABLE 1 toothbrush specification

| | Toothbrushes | | | | |
|---|---|---|---|---|---|
| | 10 | 100 | 200 | 300 | 400 |
| Rating | 7.56 | 4.85 | 3.2 | 5.95 | 6.0 |
| Overall lenght (mm) | 195 | 190 | 188 | 193 | 195 |
| Ratio length handle/overall length | 0.62 | 0.61 | 0.59 | 0.62 | 0.66 |
| Thumb rest area (mm$^2$) | 290 | 363 | 225 | 449 | 534 |
| Thumb rest bending direction | concave | concave | convex | concave | concave |
| Angle | 24° | 23.6° | 17.5° | 8.6° | 17.4° |

The test results clearly show performance advantages in terms of ergonomics, maneuverability and control of the toothbrush of the present disclosure (example embodiment 10) as compared to toothbrushes according to comparative examples 100, 200, 300 and 400. While the toothbrush of example embodiment 10 received a rating of "7.56" on a scale between "0" and "10", comparative examples 100, 200, 300 and 400 received a rating between "3.2" and "6.0" only.

The data set forth in Table 1 clearly show synergistic effects of the specific configuration/ergonomics of the toothbrush embodiment 10. In particular, the data show that the specific combination of the thumb rest area from about 202 mm$^2$ to about 360 mm$^2$ and the angle α from about 20° to about 25° provides improved maneuverability and control as compared to toothbrushes having a thumb rest area and angle below or above the claimed ranges. For example, comparative example embodiment 200 has a thumb rest area of about 225 mm$^2$. However, since the angle α is relatively low, i.e. 17.5°, the performance of said toothbrush is poor, resulting in a rating of "3.2", only. Again, although comparative example embodiment 100 has an angle α of about 23.6°, the rating of said toothbrush is poor ("4.85"), as well, as the thumb rest area is too large (about 363 mm$^2$).

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. An oral care implement having a longitudinal axis and comprising a head and a handle made of a first material, the handle having a distal end and a proximal end closest to the head, the handle comprising a thumb rest made of a second material, different from the first material, the thumb rest comprising an area of about 290 mm$^2$, wherein
   the thumb rest has a concave shape, and
   the thumb rest comprises a portion inclined with respect to a remaining portion of the thumb rest by an angle α of about 24° defined by a first line and a second line, the first line extending between a most elevated point and a lowest point of the thumb rest, and the second line extending between the lowest point and an end point of the thumb rest, the end point of the thumb rest being closest to the distal end of the handle.

2. The oral care implement of claim 1, wherein the first material is a polypropylene material.

3. The oral care implement of claim 1, wherein the second material is a thermoplastic elastomer material.

4. The oral care implement of claim 3, wherein the thermoplastic elastomer material has a Shore A hardness of about 30 to about 60.

5. The oral care implement of claim 1, wherein the head has a length extension and the handle has a length extension, the length extension of the handle extending from the distal end of the handle to the proximal end of the handle, wherein the proximal end of the handle includes the most elevated point of the thumb rest area, which is closest to the head, the length extension of the head and the handle together defining an overall length extension of the oral care implement along the longitudinal axis, wherein the overall length extension of the oral care implement is from about 194 mm to about 197 mm, and a ratio of the length extension of the handle to the overall length extension of the oral care implement is from about 0.59 to about 0.65.

6. The oral care implement of claim 5, wherein the ratio of the length extension of the handle to the overall length extension of the oral care implement is from about 0.60 to about 0.64.

7. The oral care implement of claim 5, wherein the overall length extension of the oral care implement is from about 195 mm to about 196 mm.

8. The oral care implement of claim 5, wherein the length extension of the handle is from about 119 mm to about 123 mm.

9. The oral care implement of claim 5, wherein the length extension of the head is from about 72 mm to about 76 mm.

10. The oral care implement of claim 5, wherein the overall length extension of the oral care implement is about 195 mm, and the ratio of the length extension of the handle to the overall length extension of the oral care implement is about 0.62.

11. The oral care implement of claim 5, wherein the handle is formed of at least three different materials.

12. A method for manufacturing the oral care implement according to claim 1, the method comprising the following steps:
    injection molding a first component of polypropylene material forming an underlying base structure of the oral care implement,
    injection molding a second component of polypropylene material over the first component,
    injection molding a third component of thermoplastic elastomer material over the first component and the second component.

13. The method of claim 12, wherein the third component forms the thumb rest on a front surface of the oral care implement, and a palm grip on a back surface being opposite the front surface.

* * * * *